Feb. 3, 1953
L. C. ROTTER
2,627,320
LUBRICATING SYSTEM
Filed Sept. 7, 1950
2 SHEETS—SHEET 1
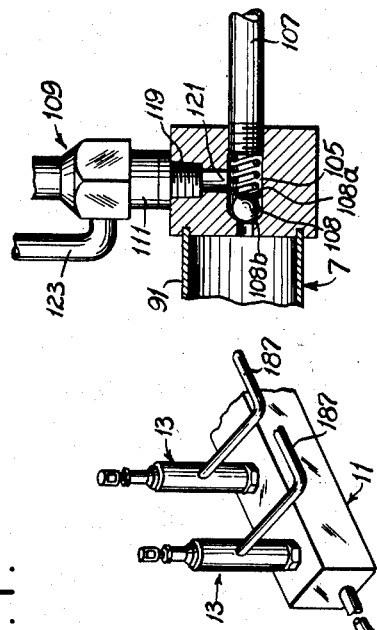
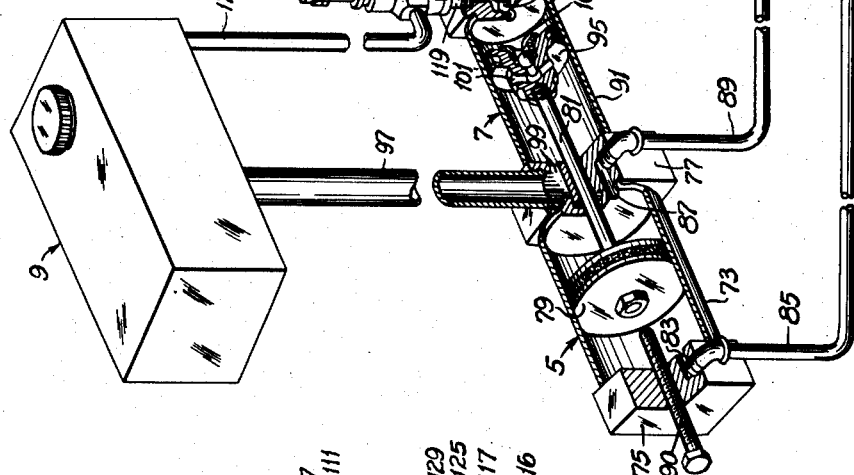
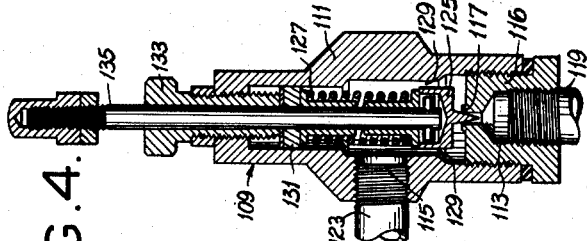
Lutwin C. Rotter,
Inventor.
Haynes and Koenig,
Attorneys.

Feb. 3, 1953 L. C. ROTTER 2,627,320
LUBRICATING SYSTEM
Filed Sept. 7, 1950 2 SHEETS—SHEET 2

Lutwin C. Rotter,
Inventor.
Haynes and Koenig,
Attorneys.

Patented Feb. 3, 1953

2,627,320

UNITED STATES PATENT OFFICE 2,627,320

LUBRICATING SYSTEM

Lutwin C. Rotter, Maplewood, Mo., assignor to Lincoln Engineering Company, St. Louis, Mo., a corporation of Missouri Application September 7, 1950, Serial No. 183,630

6 Claims. (Cl. 184—7)

This invention relates to lubricating systems and, more particularly, to automatic force-feed lubricating systems for dispensing lubricant under pressure. It is an improvement upon the system disclosed in the copending coassigned application of Carl H. Mueller and Rudy F. Schneller, Serial No. 754,148, filed June 12, 1947.

Among the several objects of the invention may be noted the provision of a force-feed lubricating system for cyclically-operated apparatus requiring lubrication in accordance with the frequency of its use adapted automatically to lubricate the apparatus upon the occurrence of a number of cycles of operation of the apparatus; the provision of a lubricating system of the class described which may be adjusted to lubricate the apparatus in response to the operation of the apparatus through different numbers of cycles, including one cycle; and the provision of a lubricating system of this class which may be operated from the apparatus to be lubricated so as not to require any outside source of power. The system of this invention differs from that disclosed in the above-mentioned copending application in that where the latter system is operable only to lubricate upon each operation of the apparatus through one cycle, the system of this invention may be used to lubricate in response to operation of the apparatus through different numbers of cycles, including one cycle.

In general, a lubricating system of my invention comprises a reciprocating means for actuating the apparatus to be lubricated through a cycle, it being understood that the invention is applicable to apparatus which is operable in cycles, and that operation of the reciprocating means through one complete cycle effects operation of the apparatus through one cycle. A reciprocating lubricant pump is provided for supplying lubricant to and actuating one or more lubricant injectors of a type which operate upon being supplied with lubricant under a predetermined injector-cycling pressure to inject a charge of lubricant, and which require relief of pressure to reset and reload with another charge. The pump is actuated by means operable in response to each operation of the apparatus through one cycle for reciprocating the pump through one complete cycle. The stroke of the pump is controlled by a means which may be adjusted to set the pump to have different lengths of stroke. A check valve is provided to check flow of lubricant from the injector or injectors back to the pump upon a return stroke of the pump and is adapted to open upon a pressure stroke of the pump. Relieving action to allow for resetting and reloading of the injector or injectors is provided for by having means for relieving pressure at a point between the check valve and the injector or injectors which functions subsequent to actuation of the injector or injectors to vent the system to allow the injector or injectors to reset and reload. With this arrangement, each time the apparatus is operated through one cycle, the pump is reciprocated through one cycle. By appropriate adjustment of the means controlling the stroke of the pump, the operation of the pump may be so regulated as to require a predetermined number of cycles of the pump before sufficient pressure is built up to actuate the injector or injectors. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a perspective view of a lubricating system of this invention, parts being broken away and shown in section;

Fig. 4 is a vertical section of a vent valve;

Fig. 6 is a fragmentary vertical section illustrating a check valve.

Similar reference characters indicate corresponding parts through the several views of the drawings.

Figure 5:
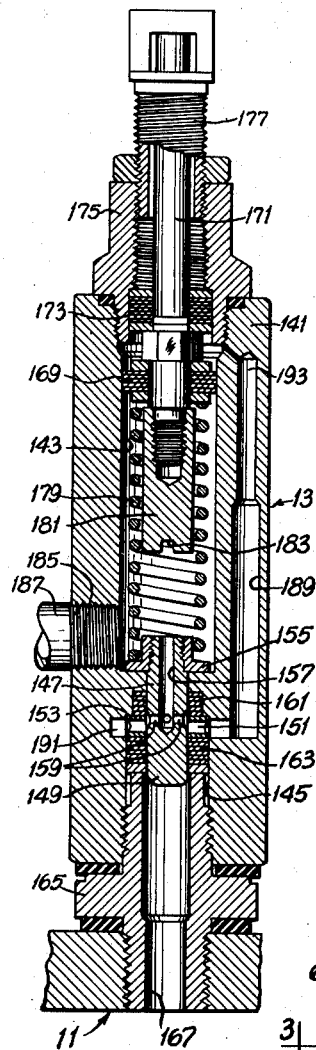
Fig. 5 is a vertical section of a lubricant injector.

Mobile equipment for handling materials, such as coal loading, mining, earth moving equipment and the like, requires frequent lubrication of its bearings and other elements to prevent undue wear. Equipment of this type generally includes a single-cycle actuator for operating such apparatus as a movable ramp or conveyor, a scraper blade, etc. This actuator operates through single cycles wherein parts of such apparatus are moved from initial positions to other positions, then returned to the initial position. This invention provides a lubricating system which can be set to function in response to operation of such apparatus through a desired number of cycles, for example, one, two, three or a higher number of cycles, to deliver measured charges of lubricant to the bearings or other elements requiring lubrication. Thus, the frequency of lubrication is determined by the frequency of operation of the apparatus to be lubricated, and the frequency of lubrication may either be the same as the frequency of operation of the apparatus through each of its cycles, or may be less than this latter frequency. That is, for example, lubrication may occur every other cycle of operation of the apparatus, in which case it may be said that the frequency of lubrication is half the frequency of operation of the apparatus.

Referring now particularly to Fig. 1, there is shown a hydraulic motor 1 for actuating any desired apparatus, such as a boom or the like (not shown). Motor 1 is controlled by a four-way valve 3. Another hydraulic motor 5 is connected in parallel with motor 1 so that both motors are operated simultaneously through one stroke upon actuation of the valve. Motor 5 drives a lubricant pump 7 which receives lubricant from a reservoir 9 and pumps it to a lubricant injector manifold 11 for delivery to a plurality of lubricant injectors 13. Each injector 13 measures out a charge of lubricant and delivers it through a suitable lubricant line to a bearing or other element of the apparatus to be lubricated.

As illustrated, motor 1 is an expansible chamber fluid motor comprising a cylinder 15 having a piston (not shown). The piston rod 16 of the motor is provided with a clevis 17 by means of which it is coupled to the apparatus to be actuated. Pressure fluid is supplied to or vented from opposite ends of the cylinder through lines 19 and 21 under control of valve 3.

Figure 3:
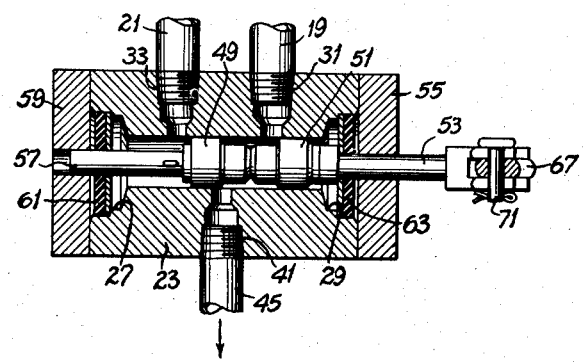
Fig. 3 is a horizontal longitudinal section of the control valve taken on line 3—3 of Fig. 2.
Figure 2:
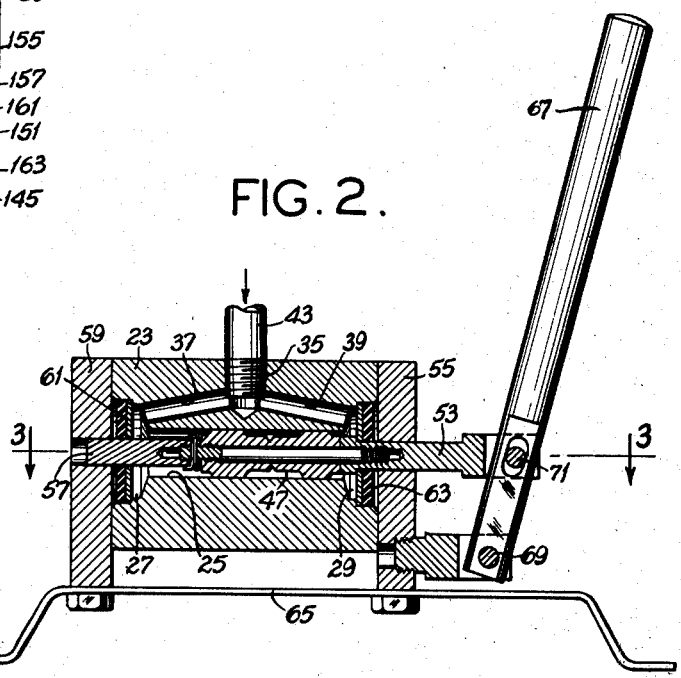
Fig. 2 is an enlarged vertical longitudinal section of a control valve taken on line 2—2 of Fig. 1.

As illustrated particularly in Figs. 2 and 3, valve 3 is a manually controlled reciprocating valve comprising a valve block 23 longitudinally bored to provide a cylinder 25 and counterbored to provide chambers 27 and 29 at the ends of the cylinder. Lines 19 and 21 are connected to the valve ports 31 and 33, which are in communication with the valve cylinder 25 at axially spaced positions. The valve block is also bored to provide an inlet port 35, from which passages 37 and 39 lead to chambers 27 and 29, respectively, and an outlet port 41 in communication with valve cylinder 25 at a position intermediate ports 31 and 33. A supply line 43 for pressure fluid from any suitable source is connected into inlet port 35. A return line 45, for returning spent fluid to its source, is connected into outlet port 41.

A valve piston 47 provided with axially spaced lands 49 and 51 reciprocates in valve cylinder 25. A piston rod 53 extends from one end of the piston through chamber 29 and through an end head 55 for the valve block 23. A stem 57 extends from the other end of the piston through chamber 27 and through an end head 59 for the other end of the block. Packing rings 61 and 63 in sealing engagement with the stem and piston rod provide seals for the chambers. The end heads are suitably mounted upon a supporting bracket 65. An operating lever 67, for reciprocating valve piston 47, is pivoted on the end head 55 at 69 and linked to the piston rod 53 at 71.

Fluid under pressure is supplied through supply line 43, valve inlet port 35 and passages 37 and 39 to chambers 27 and 29. With the valve piston 47 in the position of Figs. 2 and 3, operating lever being in its outermost position, communication is established from chamber 27 through cylinder 25 to line 21 to supply pressure fluid to the right end of cylinder 15, as viewed in Fig. 1. Communication from chamber 29 is blocked by land 51. The left end of the cylinder 15 is vented through line 19, the space within the cylinder 25 between lands 49 and 51, and valve outlet port 41 to return line 45. The piston in cylinder 15 and piston rod 16 are therefore simultaneously moved to the left to perform one stroke.

By moving operating lever 67 inward, valve piston 47 is moved to an alternate position wherein communication is established from chamber 29 through cylinder 25 to line 19 to supply pressure fluid to the left end of cylinder 15, as viewed in Fig. 1. The right end of the cylinder 15 is then vented through line 21, the space within cylinder 25 between lands 49 and 51, and valve outlet port 41 to return line 45. Communication from chamber 27 is blocked by land 49. The piston in cylinder 15 and piston rod 16 are therefore moved to the right to perform a return stroke. Thus, by moving operating lever 67 in and out through one full stroke, the motor 1 is controlled to actuate the apparatus to which it is connected through one full cycle.

The motor 5 is also an expansible chamber fluid motor and comprises a cylinder 73 having end heads 75 and 77 and a piston 79, from which a piston rod 81 extends through end head 77. End head 75 has a port 83 therein connected by a line 85 to line 21 for supplying pressure fluid to or venting it from the left end of cylinder 73. End head 77 has a port 87 therein connected by a line 89 to line 19 for supplying pressure fluid to or venting it from the right end of cylinder 73. Thus, motors 1 and 5 are in effect connected in parallel so that when valve 3 is set to supply pressure fluid through line 21 and vent fluid through line 19, pressure fluid is delivered through line 85 and port 83 to the left end of cylinder 73 and vented through port 87 and line 89. Conversely, when valve 3 is set to supply pressure fluid through line 19 and vent fluid through line 21, pressure fluid is delivered through line 89 and port 87 to the right end of cylinder 73 and vented through port 83 and line 85. Thus, piston 79 of motor 5 follows the piston of motor 1, making one full stroke each time the piston of motor 1 makes one full stroke.

A stroke-regulating screw 90 is threaded centrally in the end head 75 of motor 5 for adjustably limiting the stroke of the piston 79. Movement of the piston away from the head 75 is limited by the head 77. Movement of the piston toward head 75 is limited by engagement of the piston with the end of the screw. By threading the screw in or out, the stroke of the piston may be shortened or lengthened.

The pump 7 is illustrated as an expansible chamber fluid pump and comprises a cylinder 91 closed at its left end by the end head 77 of motor 5 and at its other end by an end head 93. Piston rod 81 of motor 5 extends through end head 77 into cylinder 91 and is connected to a valved pump piston 95 of pump 7 within cylinder 91. Lubricant is supplied to the left end of cylinder 91 from reservoir 9 through a lubricant supply line 97 connected to a lubricant inlet port 99 in end head 77. The pump piston 95 has a passage 101 therethrough in which is a check valve 103 arranged to close upon movement of the piston to the right and to open upon movement of the piston to the left, as viewed in Fig. 1. The head 93 has a lubricant outlet port 105 connected by a line 107 to injector manifold 11. In the outlet port 105 is a spring-biased check valve 109 arranged to check return flow from line 107 back into the cylinder upon a return stroke of the pump piston, and to open against the bias of the valve spring when the pump piston is driven to the right as viewed in Fig. 1 through a pressure stroke. The check valve is shown in detail in Fig. 6. As illustrated, it comprises a ball biased by a compression spring 108a against a valve seat 108b formed at the inner end of the outlet port (its end toward the pump cylinder). The compression spring 108a reacts from the end of the line 107, which is threaded in the outer end of the outlet port.

An adjustable relief valve, generally designated 109, is provided for venting the line 107 to allow for resetting and reloading of the injectors 13. This valve is connected in the system at a point between the check valve 108 and the injector manifold 11. As illustrated in detail in Fig. 4, the relief valve 109 comprises a valve body 111 having an inlet 113 and an outlet 115. The inlet is in a fitting 116 which is threaded into the lower end of the valve body and provides a valve seat. This inlet is connected by a pipe 119 to a port 121 in end head 93 in communication with the lubricant outlet port 105 outward of the valve seat 108b (see Fig. 6). The outlet 115 is connected by a line 123 to lubricant reservoir 9. A valve member 125 is biased by a compression spring 127 toward the valve seat to close the inlet 113. When the lubricant pressure on the valve member becomes high enough to overcome the bias of spring 127, the valve member moves upward to permit lubricant to flow through the inlet past the valve member to the outlet and thence through line 123 to the reservoir 9. The valve member 125 is small enough, as indicated at 129, to provide an unobstructed passage for the lubricant.

Spring 127 is compressed between the valve member 125 and a sealed collar 131 which by means of a tubular adjusting screw 133 is slidably adjustable within valve body 111. The screw 133 is threaded into the upper end of the valve body and backs up the collar. A tell-tale 135, comprising a rod pinned into the valve member and extending out of the valve body through screw 133, is provided to indicate whether the relief valve is open or closed. The pressure at which the relief valve will open may be varied by turning adjusting screw 133 to vary the bias of spring 127.

The above-described arrangement is such that upon movement of the pump piston 95 to the left as viewed in Fig. 1 through a return stroke, check valve 108 is closed and check valve 103 opens and lubricant flows through passage 101 in the pump piston from the left side of the piston to its right side to charge the pump cylinder 91. Upon movement of the pump piston to the right through a pressure stroke, check valve 103 closes and check valve 108 opens and lubricant is forced out through pump outlet 105 and line 107 to injector manifold 11. Upon movement of the pump piston to the right through a pressure stroke, lubricant is also drawn into the pump cylinder behind the piston from reservoir 9 through line 97 and inlet port 99. Assuming that the pressure developed in line 107 and manifold 11 by this pressure stroke of the pump piston is insufficient to actuate the injectors and open the relief valve 109, when the pump piston next moves to the left through a return stroke, the check valve 108 holds the pressure in line 107 and injector manifold 11.

The lubricant injectors 13 are all alike and are all connected in communication with manifold 11 to receive lubricant therefrom. There are as many injectors as necessary for delivering lubricant to the different elements of the apparatus to be lubricated. Each injector is preferably of the type disclosed in the Klein U. S. Patent 2,358,719 which may be consulted for further details. As illustrated particularly in Fig. 5, each injector comprises a hollow cylindrical injector body 141 providing a lubricant measuring chamber 143.

The lower end of the body 141 has a stepped bore 145 separated from the measuring chamber by a wall having an aperture 147 therein. A piston valve 149 is slidable across radial ports 151 in a spider 153 mounted in bore 145. The piston valve extends through the aperture 147 into the measuring chamber, where it is provided with a spring seat 155. The piston valve has an axial bore 157 therein which is in communication at its upper end with the measuring chamber. Ports 159 in piston valve 149 extend radially from the lower end of bore 157. The spider 153 is positioned between packing rings 161 and 163 for the piston valve, the packing ring and spider assembly being retained in position by a gland nut 165 threaded into the bore 145. The gland nut has a passage 167 constituting the inlet for the injector, and is threaded into the manifold 11.

A piston 169 is slidable in the measuring chamber 143. This piston is fixed upon the lower end of a tell-tale rod 171 which extends upward out of the injector body 141 through a packing 173. The latter is mounted in a fitting 175 threaded into the upper end of body 141. A guide bushing 177 for the tell-tale rod 171 is threaded into the upper end of fitting 175. A spring 179 is compressed between the piston 169 and the spring seat 155 of the valve 149. An abutment 181 extending downward from the piston 169 and having cross passage 183 in its lower end is engageable with the upper end of the valve 149.

The injector body 141 is provided with a lubricant outlet 185 at the lower end of measuring chamber 143 and below piston 169. A line 187 leading to an element of the apparatus to be lubricated is connected into this outlet. The body 141 is also formed with a by-pass, generally designated 189, which includes an annular chamber 191 surrounding the spider 153 and in communication with the radial ports 151 in the spider. From annular chamber 191 a passage 193 reaches to the upper end of the measuring chamber 143 behind the piston 169.

When pressure in the manifold 11, acting through the injector inlet 167, becomes high enough to overcome the bias of spring 179, the valve 149 is driven upward across radial ports 151 in spider 153. The pressure at which this occurs is referred to as injector-cycling pressure. Lubricant is forced through inlet 167, ports 151, annular chamber 191 and passage 193 to the space in the measuring chamber 143 above injector piston 169. This drives piston 169 downward. Assuming that the measuring chamber has been previously charged with lubricant during the previous cycle of operation, the charge of lubricant is forced out through the injector outlet 185 and line 187 to the apparatus to be lubricated. At the same time, the space in the measuring chamber above the piston 169 is filled with a charge of lubricant as the piston moves downward. Spring 179 is compressed until abutment 181 engages the upper end of valve 149. The area of piston 169 is greater than that of the lower end of valve 149 exposed to lubricant pressure in inlet 167. The pressure above the piston builds up until the force tending to move the valve downward is greater than the force tending to drive it upward, due to the differential piston and valve areas. The valve 149 is then driven partially downward until ports 151 are blocked from inlet 167 but not sufficiently to place ports 159 in the valve in communication with ports 151. As soon as ports 151 are blocked from inlet 167, no pressure is available to drive the piston farther downward.

The relief valve 109 is set to open when the pressure in the manifold 11 slightly exceeds the injector-cycling pressure. Once the injectors have been operated upon the pressure reaching injector-cycling value, the pressure builds up to the point where valve 109 opens, whereupon the pressure in line 107 and manifold 11 is relieved, lubricant bleeding through valve 109 back to the reservoir 9. This relieves the upward pressure on the lower end of the piston valve 149 and the spring 179 drives the valve farther downward to its Fig. 5 position. This cuts off inlet 167 from ports 151 and places the radial ports 159 in the valve in communication with annular chamber 191. Piston 169 is then driven upward by spring 179 and forces the lubricant above the piston through passage 193, annular chamber 191, ports 159 and valve passage 157 into the measuring chamber 143 below the piston. The injector is thus reloaded with a measured charge of lubricant for the next cycle.

The operation of the lubricating system is as follows:

The relief valve 109 is set to open upon development of pressure in line 107 slightly exceeding injector-cycling pressure. Screw 90 is set to limit the stroke of the motor piston 79 and the pump piston 95 to a distance such that a desired number of cycles of the pump piston are required to build up injector-cycling pressure in the line 107. Assume, for example, that the screw is set so that four cycles are necessary. It will be understood that the shorter the stroke, the more cycles will be necessary to develop injector-cycling pressure.

Fig. 1 illustrates the positions of the parts at about the completion of a forward stroke of pump piston 95. The operating lever 67 is in its outer position and valve 3 is set to supply pressure fluid through line 21 to the right end of cylinder 15 and to vent the left end of cylinder 15 through line 19. The piston in cylinder 15, piston rod 16 and clevis 17 are retracted. Pressure fluid is supplied to the left end of cylinder 73 from line 21 through line 85 and port 83, and vented from the right end of cylinder 73 through port 87 and line 89 to line 19. The check valve 103 in the pump position is closed and the pump piston has delivered lubricant under pressure to the manifold 11 through pump outlet 105 and line 107, check valve 108 having been opened by the pressure developed by the pump piston. Also, lubricant has been drawn into the pump cylinder on the left side of the pump piston. Assuming that this forward or pressure stroke of the pump piston had resulted in development of sufficient pressure in line 107 and manifold 11 to cycle the injectors and open relief valve 109, line 107 will be bled, and the injectors will be set and loaded for the next injection.

When operating lever 67 is then moved inward, valve 3 is set to supply pressure fluid through line 19 to the left end of cylinder 15 and to vent the right end of cylinder 15 through line 21. This moves the piston in cylinder 15, piston rod 16 and clevis 17 forward (to the right) to actuate the apparatus controlled thereby through half a cycle. Pressure fluid is thereupon supplied from line 19 through line 89 and port 87 to the right end of cylinder 73 and vented from its left end through port 83 and line 85 to line 21. This drives piston 79, piston rod 81 and pump piston 95 to the left. Check valve 108 closes. Check valve 103 opens, and lubricant to the left of piston 95 passes through passage 101 to the right of piston 95 to reload the pump with lubricant.

When operating lever 67 is next moved outward to retract piston rod 16 and clevis 17, thereby to actuate the apparatus controlled by the motor 1 through the return half of its cycle, all parts move to their Fig. 1 positions. The pump piston 95 makes a forward pumping stroke and check valve 108 opens and lubricant is forced through the pump outlet 105 to line 107 and manifold 11. However, the stroke of the pump piston, and accordingly the volumetric displacement of the piston, is not great enough to build up injector-cycling pressure, but, with screw 90 set as mentioned above, is only great enough to build up about one-fourth injector-cycling pressure.

When the operating member 67 is next moved inward to extend piston rod 16 and clevis 17, the pump piston 95 makes a return stroke. As the pump piston travels through the return stroke, check valve 108 is closed to hold the pressure previously built up in line 107 and manifold 11 upon the preceding pressure stroke of the piston.

When the operating member 67 is next moved outward to retract piston rod 16 and clevis 17, the pump piston 95 is driven through another pressure stroke and more pressure is built up in line 107 and manifold 11 to about one-half injector-cycling pressure.

Upon such actuation of lever 67 as to effect a third reaction of the pump piston 95, then a third pressure stroke, then a fourth retraction, and finally a fourth pressure stroke of the pump piston, during the fourth pressure stroke, the pressure in line 107 and manifold 11 is finally built up to injector-cycling value. This causes the injectors 13 to deliver their charges of lubricant through the respective lines 187 to the elements of the apparatus to be lubricated. Immediately following this action of the injectors, pressure rises to such value as to open relief valve 109, whereupon line 107 and manifold 11 are vented back to the reservoir 9. The injectors then reset and reload for the next injection.

Then, upon the operation of the motor 1 through the next four complete cycles of its operation, the injectors are again actuated to inject lubricant, and then to reset and reload, and so on.

It will be understood that by changing the setting of screw 90, the number of cycles of the pump piston 95 to effect one cycling of the injectors may be changed. The specific mention above of four cycles of the pump piston for one cycling of the injectors is only exemplary.

Thus, the lubricating system of this invention functions to deliver measured charges of lubricant to the bearings or other elements of the apparatus to be lubricated upon the completion of a predetermined desired number of cycles of operation of the apparatus. By fully retracting the screw 90, the system could be set to cause operation of the injectors upon each cycle of operation of the apparatus, or, by suitable adjustment of the screw, to cause operation of the injectors upon every second or every third or every fourth, etc., cycle of the apparatus. The lubricating system of this invention is particularly adapted for use with apparatus utilizing a hydraulic pressure system for actuating various parts of the apparatus since it may be directly connected into the hydraulic pressure system to be operated thereby. Thus, it does not require any source of power other than that on the apparatus for operating its parts, and eliminates any necessity for making connections by means of air lines, electrical cables or the like from the apparatus to a remote power source.

The term "motor" is employed herein generically to designate any suitable source of mechanical power for imparting the desired motions.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A lubricating system for apparatus which is operable in cycles, comprising reciprocating means for actuating the apparatus through a cycle, a reciprocating lubricant pump, means operable in response to each operation of the apparatus through one cycle for reciprocating the pump through one cycle, means for adjustably limiting the stroke of the pump, a lubricant injector having an inlet in communication with the outlet of the pump and an outlet through which a charge of lubricant may be fed to the apparatus, said injector including means for feeding a charge of lubricant through its outlet to said apparatus upon being supplied with lubricant at a predetermined pressure, and to reset and reload with another charge of lubricant upon relief of pressure, a check valve arranged to check flow of lubricant from the injector back to the pump upon return strokes of the pump and adapted to open upon pressure strokes of the pump, and means for relieving pressure at a point between the check valve and the injector subsequent to actuation of the injector.

2. A lubricating system for apparatus which is operable in cycles, comprising a reciprocating fluid motor for actuating the apparatus through a cycle, a reciprocating lubricant pump, means operable in response to reciprocation of said motor through one cycle for reciprocating the pump through one cycle, means for adjustably limiting the stroke of the pump, a lubricant injector having an inlet in communication with the outlet of the pump and an outlet through which a charge of lubricant may be fed to the apparatus, said injector including means for feeding a charge of lubricant through its outlet to said apparatus upon being supplied with lubricant at a predetermined pressure, and to reset and reload with another charge of lubricant upon relief of pressure, a check valve arranged to check flow of lubricant from the injector back to the pump upon return strokes of the pump and adapted to open upon pressure strokes of the pump, and means for relieving pressure at a point between the check valve and the injector subsequent to actuation of the injector.

3. A lubricating system for apparatus which is operable in cycles, comprising a motor for actuating the apparatus through a cycle, a reciprocating lubricant pump, a follow-up motor operable in response to actuation of said apparatus through one cycle for reciprocating the pump through one cycle, means for adjustably limiting the stroke of the pump, a lubricant injector having an inlet in communication with the outlet of the pump and an outlet through which a charge of lubricant may be fed to the apparatus, said injector including means for feeding a charge of lubricant through its outlet to said apparatus upon being supplied with lubricant at a predetermined pressure, and to reset and reload with another charge of lubricant upon relief of pressure, a check valve arranged to check flow of lubricant from the injector back to the pump upon return strokes of the pump and adapted to open upon pressure strokes of the pump, and means for relieving pressure at a point between the check valve and the injector subsequent to actuation of the injector.

4. A lubricating system for apparatus which is operable in cycles, comprising a pair of reciprocating fluid motors connected in parallel in a fluid circuit under control of a valve, whereby both motors may be reciprocated simultaneously through single cycles, one of said motors being adapted to actuate the apparatus, the other being coupled to a reciprocating lubricant pump for actuating the pump through a cycle wherein it makes a pressure stroke and a return stroke, a lubricant injector having an inlet in communication with the outlet of the pump and an outlet through which a charge of lubricant may be delivered to said apparatus, means for adjustably limiting the stroke of the said other motor and the pump, a check valve arranged to check flow of lubricant from the injector back to the pump upon return strokes of the pump and adapted to open upon pressure strokes of the pump, and means for relieving pressure at a point between the check valve and the injector subsequent to actuation of the injector.

5. A lubricating system comprising a lubricant injector for intermittently feeding charges of lubricant to an apparatus to be lubricated, a lubricant pump comprising a cylinder having a pump piston reciprocable therein for intermittently feeding lubricant to the injector, a fluid motor comprising a cylinder having a piston reciprocable therein coupled to the pump piston for reciprocating it, another fluid motor comprising a cylinder having a piston therein adapted to be coupled to said apparatus for operating it in cycles, a pressure fluid circuit including fluid connections to opposite ends of both motor cylinders, a control valve in said circuit having a first position wherein pressure fluid is supplied to one end of each of the motor cylinders and vented from their other ends, and a second position wherein pressure fluid is vented from said one end of each of the motor cylinders and supplied to their other ends, means for adjustably limiting the stroke of the first-mentioned motor piston and pump piston, a check valve arranged to check flow of lubricant from the injector back to the pump upon return strokes of the pump piston and adapted to open upon pressure strokes of the pump piston, and a relief valve for relieving pressure at a point between the check valve and the injector subsequent to actuation of the injector.

6. In a lubricating system, a reciprocating lubricant pump comprising a pump cylinder and a pump piston reciprocable in the cylinder, the pump cylinder having an inlet and an outlet, a lubricant reservoir in communication with the pump inlet, a lubricant injector connected by a lubricant line to the pump outlet, the injector being of a type adapted to feed a measured charge of lubricant upon being supplied with lubricant under a predetermined injector-cycling pressure through said lubricant line and to reload from the line upon relief of pressure in said line, a reciprocating fluid motor comprising a motor cylinder and a motor piston reciprocable in said cylinder, a piston rod connecting the motor and pump pistons, an adjustable stop for adjustably limiting the stroke of the motor and pump pistons, a check valve between the pump outlet and injector arranged to check flow of lubricant from the injector back to the pump upon return strokes of the pump piston and adapted to open upon pressure strokes of the pump piston, and a pressure-responsive relief valve connected to vent the lubricant line between the check valve and injector and adapted to open upon development in said line of pressure somewhat higher than the injector-cycling pressure required to actuate the injector.

LUTWIN C. ROTTER.

REFERENCES CITED

The following references are of record in the file of this patent:

UNITED STATES PATENTS

| Number | Name | Date |
|---|---|---|
| 298,836 | Dearing | Dec. 20, 1938 |
| 2,141,022 | Rotter | Dec. 20, 1938 |